May 19, 1936.　　P. R. SCHREURS　　2,041,435
GAS SEPARATOR
Filed July 13, 1934
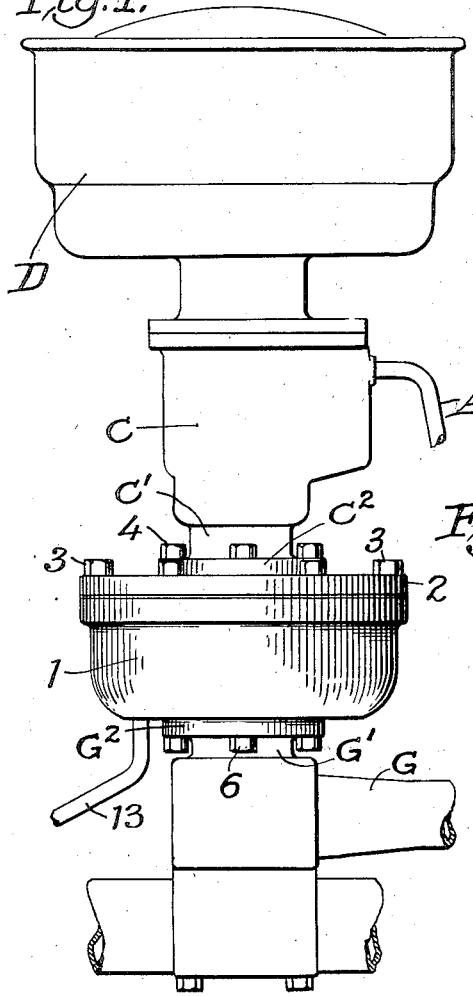
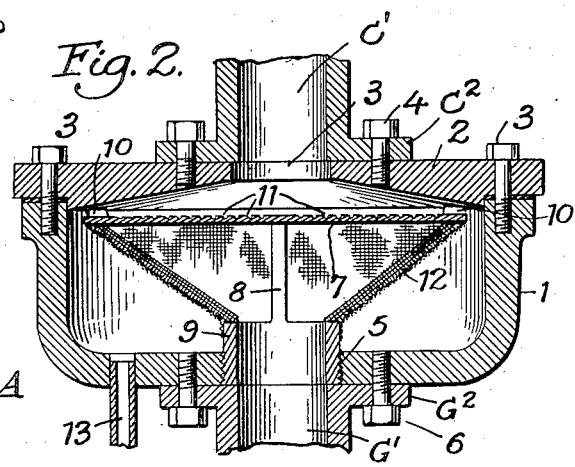
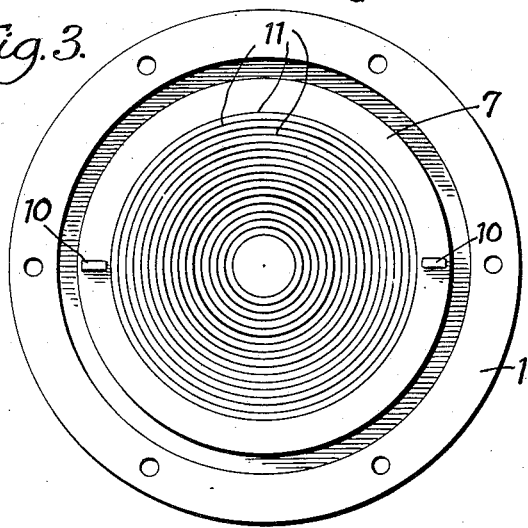
Inventor
Paul R. Schreurs
By
Attorneys Patented May 19, 1936

2,041,435

UNITED STATES PATENT OFFICE 2,041,435

GAS SEPARATOR

Paul Raymond Schreurs, Muscatine, Iowa

Application July 13, 1934, Serial No. 735,055

8 Claims. (Cl. 183—10)

This invention is a novel improvement in apparatus for feeding fuel gases in internal combustion engines and the like, the present invention being an improvement upon the apparatus shown and described in my co-pending application Serial No. 667,750, filed April 24, 1933 which discloses an apparatus in which liquid fuel is drawn from the main supply by a fuel pump and forced into a carburetor, preferably of the down-draft type, the carbureted fuel being delivered into a separating chamber interposed between the carburetor and intake manifold, said separating chamber having a filter therein impervious to liquids and consisting of a plurality of layers of metallic filter cloth of exceedingly fine mesh (about 500 mesh) which filter will retain and hold any liquid globules of hydrocarbons or oils and will prevent such from passing therethrough, while permitting the air containing only dry fuel gases to be pulled through the filter by suction or vacuum created in the intake manifold. The unvaporized liquid fuel is collected in a trap at the lower end of the separating chamber and returned directly to the main fuel supply, or to the fuel pump to be subsequently returned to the carburetor.

The principal objects of the present invention are to provide a chamber in the form of a relatively flat covered bowl having a fuel inlet in its upper end receiving the discharge from the carburetor, and having an outlet in its lower end for the dry fuel vapors, a filter unit of inverted conical form being housed in the chamber around the outlet, said unit consisting of a solid plate of somewhat smaller diameter than and fitting within the bowl spaced from but supported upon a nipple which screws into the outlet of the bowl, said plate having a plurality of concentric grooves or the like in its upper face below the inlet to retain the liquid fuel on the plate until the globules are carried off or broken up by suction for mixing with the air, the sides of the filter unit between the plate and nipple being formed of a plurality of layers of filter cloth (about 500 mesh) to form a dense filter screen having exceedingly fine minute passages therein to retain and hold any liquid globules of hydrocarbons or oils and prevent them from passing therethrough while permitting the air containing only dry fuel gases to be pulled through the filter by the suction or vacuum set up in the intake manifold. The design of the chamber and filter unit is such that the suction of the engine creates a circulation in the chamber that has a tendency to swivel and throw the globules of hydrocarbon or oil around in the bowl and to break up the globules and mix the fuel and air more thoroughly; also the circulation has a tendency to wash dirt from the air as it comes into the carburetor making a much cleaner fuel gas that passes through the filter cloth, since the air must go around in the bowl and over the top of the plate and then pass upwardly through the filter cloth, and in this way any heavy particles that might be contained therein that have not vaporized properly are separated. Furthermore in my present design more cloth surface may be provided, and a cyclonic movement of the air is created to tear apart the unvaporized particles of gasoline.

The apparatus is particularly adapted for use with carburetors of the down-feed type in which the fuel vapors are passed downwardly through the carburetor into the intake manifold, such carburetors being particularly subject to flooding and consequent wasting of fuel, but by use of my apparatus all liquid fuel passing the carburetor may be collected and returned directly to the fuel pump which feeds the carburetor, or directly to the fuel tank, thereby saving the excess liquid fuel which would otherwise be wasted.

To enable others to understand and use the invention I will explain one practical embodiment thereof, as illustrated in the accompanying drawing; and in the appended claims will summarize the essentials of the invention, and novel features of construction, and novel combination of parts, for which protection is desired.

In said drawing:—

Fig. 1 is a side elevation showing one arrangement of carburetor, separating chamber, an intake manifold.

Fig. 2 is an enlarged vertical section through the separating chamber, and some adjacent parts of the engine or motor.

Fig. 3 is a top plan view of the chamber, with cover plate removed.

As shown in Fig. 1 the carburetor C of the engine or motor (not shown) is of conventional type, receiving air from a conventional air cleaner and intake silencer D, the carburetor being supplied with liquid fuel through pipe A by a suitable fuel feed pump or the like. The intake manifold of the engine cylinders is shown at G. Any type of carburetor or fuel vaporizer either down-draft, or up-draft, also any form of fuel feed to the carburetor, might be used, and I do not limit my invention to the particular type shown.

Disposed between the inlet manifold G and the carburetor C is my novel separating chamber which comprises a relatively flat bowl shaped casing 1, provided with a cover 2 secured by bolts 3 to the sides of the bowl, said cover 2 having an inlet 3 at its center directly opposite the outlet C' of carburetor C. Outlet C' of the carburetor may have a flange $C^2$ on its lower end secured by bolts 4 to cover 2. Casing 1 has a threaded outlet 5 in its bottom directly opposite the inlet G' of intake manifold G and the inlet G' may have a flange $G^2$ secured by bolts 6 to the bottom of bowl 1. Suitable gaskets may be provided between the parts $C^2$ and 2; 2 and 1; and 1 and $G^2$.

Within bowl 1 is an inverted conical filter, preferably comprising a plate 7, of brass or the like, slightly smaller than the internal diameter of the bowl 1, said plate being fixedly mounted upon fingers 8 extending upwardly from a nipple 9 threaded into outlet 5 of the bowl. Upon the upper face of plate 7 are lugs 10 by which the filter unit 7, 8, 9, may be screwed into or out of the outlet 5. Also upon the upper face of plate 7 are a plurality of concentric grooves or depressions 11 for the purpose hereinafter set forth. The sides of the filter unit converge from the periphery of plate 7 to that of nipple 9, and preferably comprise a plurality of thicknesses of metallic filter cloth 12 having exceedingly fine openings (about 500 mesh) superimposed or wrapped layer upon layer to form an exceedingly fine screen of substantial thickness. The upper ends of the layers of metallic cloth 12 are soldered together and to said plate 7 to close the upper end of filter unit, while the lower ends of the layers of filter cloth 12 are soldered together and to the nipple 9. The filter unit 7, 8, 9, 12 thus formed, is impervious to liquid fuel carried over into bowl 1 due to flooding or excessive choking of the carburetor, and the cloth 12 will effectively retain any unvaporized liquid particles that may be introduced into the bowl such as ungasified particles or oils, or any parts of the gasoline or distillates such as kerosene or heavy hydrocarbons, and same will be deposited in and retained in filter 12 until taken up or entirely vaporized by the air.

In event the carburetor C should flood and liquid fuel should be passed over from the carburetor into bowl 1 the liquids which collect in the bottom of the bowl are carried off by pipe 13 entering the bottom of bowl 1. Pipe 13 may be provided as shown in my aforesaid application with a check valve (not shown) permitting the liquid therein to drop into a trap (not shown) in a pipe leading back to the fuel feed pump whereby the excess liquids are eventually returned to the carburetor C instead of being wasted when the carburetor overflows, thereby effecting a substantial saving in fuel consumption.

The grooves 11 in plate 7 immediately under the intake from the carburetor C retain the liquid gasoline therein until the air circulating in the bowl tears the globules apart. The suction of the intake manifold G of the engine creates a circulation of air and vapors in the bowl sufficient to tear apart the gasoline globules and throw same around in the bowl to break up the globules and cause same to mix more thoroughly with the air. This circulation also has a tendency to wash any dirt from the air as it comes into the carburetor C making a much cleaner gas that passes through the filter cloth 12, since the air must swirl around in the bowl, and over the top of plate 7 and finally pass up through the filter cloth 12. In this way any heavy particles that might be contained therein and which have not vaporized properly are separated. In my present design of bowl and filter unit I am able to utilize more cloth surface, and a cyclonic movement of the air is created sufficient to tear apart the unvaporized particles of gasoline, and I find that a drier more powerful gas is developed.

The cost of construction is very little more than the apparatus described in my co-pending application and the feature of depositing the carbureted gasoline on the plate 7 before it passes to the filter cloth 12 makes a decided improvement; also by providing a round bowl 1 more of a circular or cyclonic action of the vapors is created, and by providing the grooves 11 in the plate 7 I am able to retain or hold the unvaporized heavier particles of the gasoline, and save considerable fuel in the operation or power developed, and in fact, make a much more practical construction.

All the good features claimed in my co-pending application are retained in the present construction, such as saving of wear and tear, non-dilution of oil, maintaining the spark-plugs clean by lack of carbon forming particles, and retention of the dirt and heavy ends of gasoline and returning them back to the fuel tank instead of passing same into the cylinders of the engine; also a much drier and more powerful gas is developed with the present construction than in my former construction of filter unit. By the use of my gas separator the efficiency and power of the engine is greatly increased; the engine can be started in "high" without jerking; the engine will not back-fire, choke or flood; and as a result of the more readily combustible gaseous mixture obtained, the formation of carbon in the cylinders is reduced.

If desired the plate 7 may be made slightly dished, or may be provided with flukes; also a rotary fan may be used in the bowl to throw the heavy ends of the gasoline to the walls of the casing which action would have a tendency to vaporize or mix more thoroughly the air and the gasoline, also a tendency to separate the heavy ends.

I claim:—

1. A gas separator comprising a casing having gaseous fuel mixture inlet at its upper end adapted to be connected with a carburetor, and having an outlet at its lower end for gases adapted to be connected with an engine intake manifold; and a filter unit in said casing consisting of a plate extending substantially across the casing adjacent the inlet against which the fuel from the carburetor is directed, and a screen impervious to liquids extending between the plate and contracting towards the outlet, the space between the walls of the casing and lower portion of the screen forming a surge chamber for the carburetted fuel before it passes through the screen.

2. In a gas separator as set forth in claim 1, a collar on said unit adapted to fit the outlet, means for supporting the plate on the collar in spaced relation; and said screen being interposed between the plate and collar.

3. A gas separator comprising a substantially flat bowl shaped casing having a gaseous fuel mixture inlet at its upper end adapted to be connected with a carburetor, and having a restricted outlet at its lower end for gases adapted to be connected with an engine intake manifold, and having an outlet for ungasified fuel; and a substantially inverted cone shaped filter unit in said casing consisting of a plate extending substantially across the casing adjacent the inlet against which the fuel from the carburetor is directed, and a screen impervious to liquids extending between the plate and gas outlet, the space between the walls of the casing and lower portion of the screen forming a surge chamber for the carburetted fuel before it passes through the screen.

4. In a gas separator as set forth in claim 3, a collar on said unit adapted to fit said outlet, means for supporting the plate on said collar in spaced relation; and said screen being interposed between the plate and collar.

5. In combination, a vertical conduit; means in said conduit for carburetting air with liquid fuel; an enlarged chamber in said conduit below said means; said chamber having an outlet at its lower end; and a filter unit in said chamber consisting of a plate disposed adjacent the upper end of the chamber against which the carburetted fuel is directed, said plate extending adjacent the side walls thereof; and a substantially inverted conical screen impervious to liquids extending between the plate and outlet.

6. In a gas separator as set forth in claim 5, a collar on said unit adapted to fit the outlet, means for supporting the plate on the collar in spaced relation; and said screen being interposed between the plate and collar.

7. In a gas separator as set forth in claim 5, said plate being substantially horizontally disposed, and means on the plate for assisting in retaining globules of liquid fuel deposited thereon from the carburetting means.

8. In combination, a vertical conduit; means in said conduit for carburetting air with liquid fuel; an enlarged substantially flat bowl shaped chamber in said conduit below said means; said chamber having an outlet at its lower end; and a filter unit in said chamber consisting of a plate disposed adjacent the upper end of the chamber against which the carburetted fuel is directed, said plate extending adjacent the side walls thereof; and a substantially inverted conical screen impervious to liquids extending between the plate and the outlet, the space between the walls of the chamber and the lower portion of the screen forming a surge chamber for the carburetted fuel before it passes through the screen.

PAUL RAYMOND SCHREURS.